United States Patent [19]

Neri Vela et al.

[11] Patent Number: 4,725,236
[45] Date of Patent: Feb. 16, 1988

[54] UNIVERSAL CONTOUR CHART OF ELEVATION AND AZIMUTH ANGLES OF PARABOLIC ANTENNAS FOR COMMUNICATING WITH ANY GEOSTATIONARY SATELLITE

[76] Inventors: Rodolfo Neri Vela, Playa Copacabana; Bernardo J. Martinez Avalos, Lomas De Sanisidro, both of Mexico

[21] Appl. No.: 775,163

[22] Filed: Sep. 12, 1985

[30] Foreign Application Priority Data

Jun. 26, 1985 [MX] Mexico ........................ 205779/72607

[51] Int. Cl.⁴ .............................................. G09B 29/00
[52] U.S. Cl. ................................... 434/153; 33/1 CC; 283/34
[58] Field of Search ............... 434/153, 150, 106, 140; 283/34, 35; 235/85 R, 89 R, 89 A; 33/1 CC, 1 SC, 1 SD

[56] References Cited

U.S. PATENT DOCUMENTS

| | | | |
|---|---|---|---|
| 2,314,353 | 3/1943 | Jasperson | 33/1 SD |
| 2,494,536 | 1/1950 | Atwood | 283/34 |
| 3,133,352 | 5/1964 | Jasperson | 33/1 CC |
| 3,535,790 | 10/1970 | Gray | 33/1 SC |
| 3,634,939 | 1/1972 | Sorem | 33/1 SC |
| 4,304,554 | 12/1981 | Slayden | 434/106 |

*Primary Examiner*—William H. Grieb
*Attorney, Agent, or Firm*—Roylance, Abrams, Berdo & Goodman

[57] ABSTRACT

This invention refers to a universal contour chart that allows to read the values of the elevation and azimuth angles that the parabolic antenna of an earth station must have so that it can receive and/or transmit television, telephony or data signals from and/or towards any artificial satellite in geostationary orbit. The invention is of easy operation and very practical, and consists of a geographical map of the world over which slides or displaces a separate transparent sheet that contains the printed angle contours.

4 Claims, 2 Drawing Figures

UNIVERSAL CONTOUR CHART OF ELEVATION AND AZIMUTH ANGLES OF PARABOLIC ANTENNAS FOR COMMUNICATING WITH ANY GEOSTATIONARY SATELLITE

DESCRIPTION

There are well known graphs of elevation and azimuth angles that give the required orientation of a parabolic antenna so that it can communicate with any geostationary satellite. These graphs, however are little illustrative and only consist of curves drawn on a pair of axes in rectangular coordinates, whereas this invention uses both contour plots and a geographical map of the areas of interest. Some similar contours to the ones used in this invention have been published in specialized satellite magazines or journals, but they have the great disadvantage that the information they display applies at once only to one particular satellite and to a very limited and specific geographical region, whereas with this invention the contours provided are useful for any geostationary satellite and also for any chosen geographical region of the world.

The objective of this invention is to avoid or eliminate the useless need of creating a separate contour map for each particular case of a very specific satellite related to a determined geographical region; this objective is met through a universal coutour chart of easy operation and very practical, as it can be used and provides results for all possible combination cases of desired satellite and selected geographical zone.

The details associated with this universal contour chart are clearly given in the description that follows and the two drawings provided.

Figure 1:
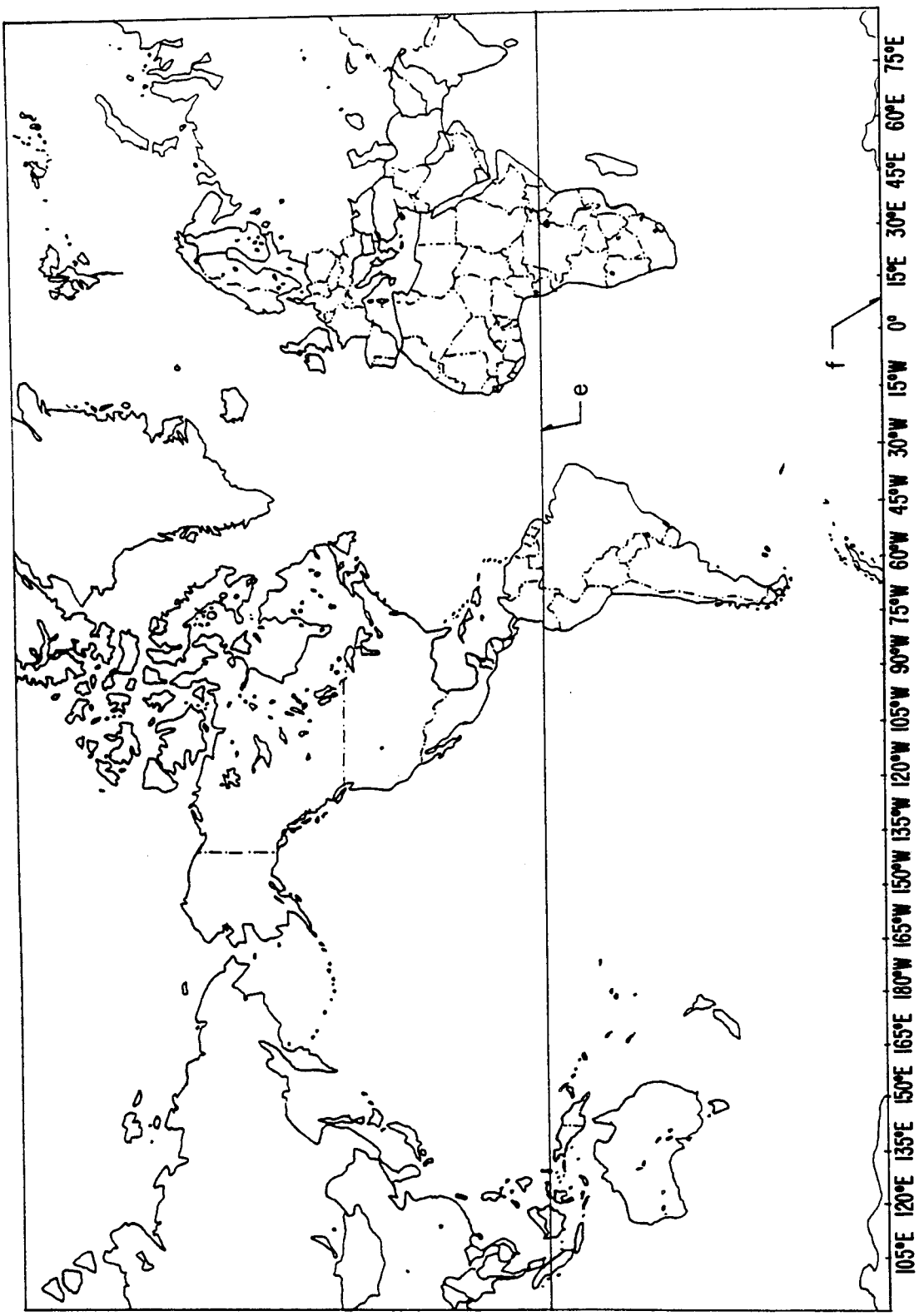
FIG. 1, is a geographical map of the world containing the borders of each country.
Figure 2:
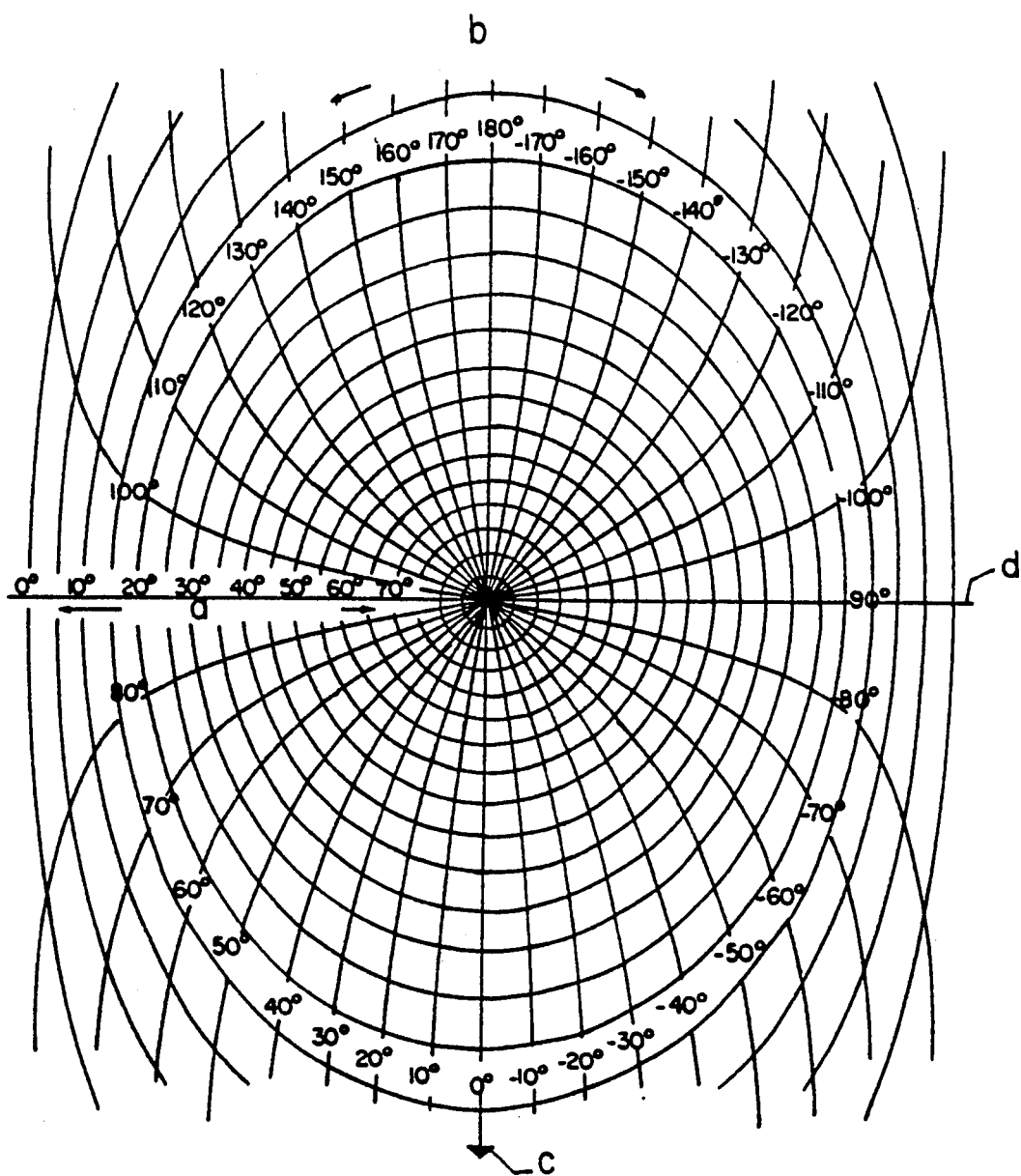
FIG. 2, is the set of contours that allow to read the angle values. These contours can be printed on a transparent sheet that freely slides or displaces over the map of FIG. 1.

With reference to both figures, the equator line e in FIG. 1 must coincide with the horizontal line d in FIG. 2. Both lines are drawn thicker than the others to identify them easily. Next, FIG. 2 must be displaced over FIG. 1, so that the arrow c shown at the bottom part of the central vertical line in FIG. 2 coincides over FIG. 1 with the position of the geostationary satellite for which one desires to know the elevation angle a and the azimuth angle b that the parabolic antennas must have to communicate with it. The position of the desired satellite is read on the longitude scale, east or west, provided at the bottom in FIG. 1. For instance, if the desired satellite is located at 20° west, then the arrow c in FIG. 2 must coincide with the corresponding point at a geographical longitude of 20° west read on scale f, shown at the bottom in FIG. 1. Having done this, the values of the elevation angle a and the azimuth angle b of the earth station parabolic antennas located in any part of the world covered by the satellite radiated power are read directly over the contours that pass through the geographical point where each antenna is or is to be installed; it is clear that if necessary, contour interpolations can be done.

We claim:

1. An apparatus to determine the elevation and azimuth angles of parabolic antennas oriented to any wished geostationary satellite, each parabolic antenna being locatable in any geographical region of interest in any part of the world comprising a geographical map of the world, showing its division into countries, and having along the bottom part a linear scale that indicates the geographical longitude along the Equator where the desired geostationary satellite is located; and a transparent sheet that can be displaced over the map and that has drawn on it, the elevation azimuth angles as contour plots, the transparent sheet having an arrow at the bottom, that is used to coincide with the geographical longitude scale of the bottom of the map, and also has a guiding line crossing it in the middle that must coincide with the equatorial line of the map.

2. An apparatus as claimed in claim 1, where the geographical zone included in the map is the territory of the United States of America, with a similar transparent sheet of contour plots displacing over the map.

3. An apparatus as claimed in claim 1, where the geographical zone included in the map is the territory of Mexico, with a similar transparent sheet of contour plots displacing over the map.

4. An apparatus as claimed in claim 1, where the geographical zone included in the map is any geographical zone of interest.

* * * * *